United States Patent
Schroeter et al.

(10) Patent No.: US 8,568,918 B2
(45) Date of Patent: Oct. 29, 2013

(54) BATTERY HAVING A PLURALITY OF SINGLE CELLS

(75) Inventors: Dirk Schroeter, Winnenden (DE); Jens Meintschel, Bernsdorf (DE); Rainer Kaufmann, Stuttgart (DE); Arnold Lamm, Elchingen (DE); Wolfgang Warthmann, Weinstadt (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/637,300

(22) PCT Filed: Dec. 8, 2010

(86) PCT No.: PCT/EP2010/007458
§ 371 (c)(1),
(2), (4) Date: Nov. 6, 2012

(87) PCT Pub. No.: WO2011/116804
PCT Pub. Date: Sep. 29, 2011

(65) Prior Publication Data
US 2013/0045409 A1 Feb. 21, 2013

(30) Foreign Application Priority Data
Mar. 26, 2010 (DE) .......................... 10 2010 013 023

(51) Int. Cl.
*H01M 10/50* (2006.01)
(52) U.S. Cl.
USPC .......................................... 429/178; 429/120
(58) Field of Classification Search
USPC ........................... 429/211, 120, 157, 170, 178
See application file for complete search history.

(56) References Cited

U.S. PATENT DOCUMENTS

| | | | |
|---|---|---|---|
| 2009/0111009 A1* | 4/2009 | Goesmann et al. | 429/120 |
| 2011/0135975 A1* | 6/2011 | Fuhr et al. | 429/53 |
| 2011/0281162 A1* | 11/2011 | Buiel et al. | 429/211 |
| 2012/0121949 A1* | 5/2012 | Eberhard et al. | 429/82 |

FOREIGN PATENT DOCUMENTS

| | | |
|---|---|---|
| DE | 10 2008 034 867 A1 | 1/2010 |
| JP | 2009-170258 A | 7/2009 |
| JP | 2009-238654 A | 10/2009 |
| WO | WO 2010/031856 A2 | 3/2010 |

OTHER PUBLICATIONS

International Search Report with English translation dated Apr. 5, 2011 (six (6) pages).
Form PCT/ISA/237 (eight (8) pages).

* cited by examiner

*Primary Examiner* — Mark F Huff
*Assistant Examiner* — Monique Wills
(74) *Attorney, Agent, or Firm* — Crowell & Moring LLP

(57) ABSTRACT

A battery is provided with a plurality of individual cells connected in series and/or in parallel to one another, and at least one cooling plate arranged on the pole side on the individual cells, with current drain tabs of electric poles of the individual cells being thermally coupled with the cooling plate and being angled such that they extend parallel to the cooling plate. Current drain tabs of adjacent individual cells are electrically interconnected in non-positive and/or in positive manner and pressed with the cooling plate in non-positive and/or in positive manner by clamping elements.

14 Claims, 8 Drawing Sheets

BATTERY HAVING A PLURALITY OF SINGLE CELLS

BACKGROUND AND SUMMARY OF THE INVENTION

Figure 1:
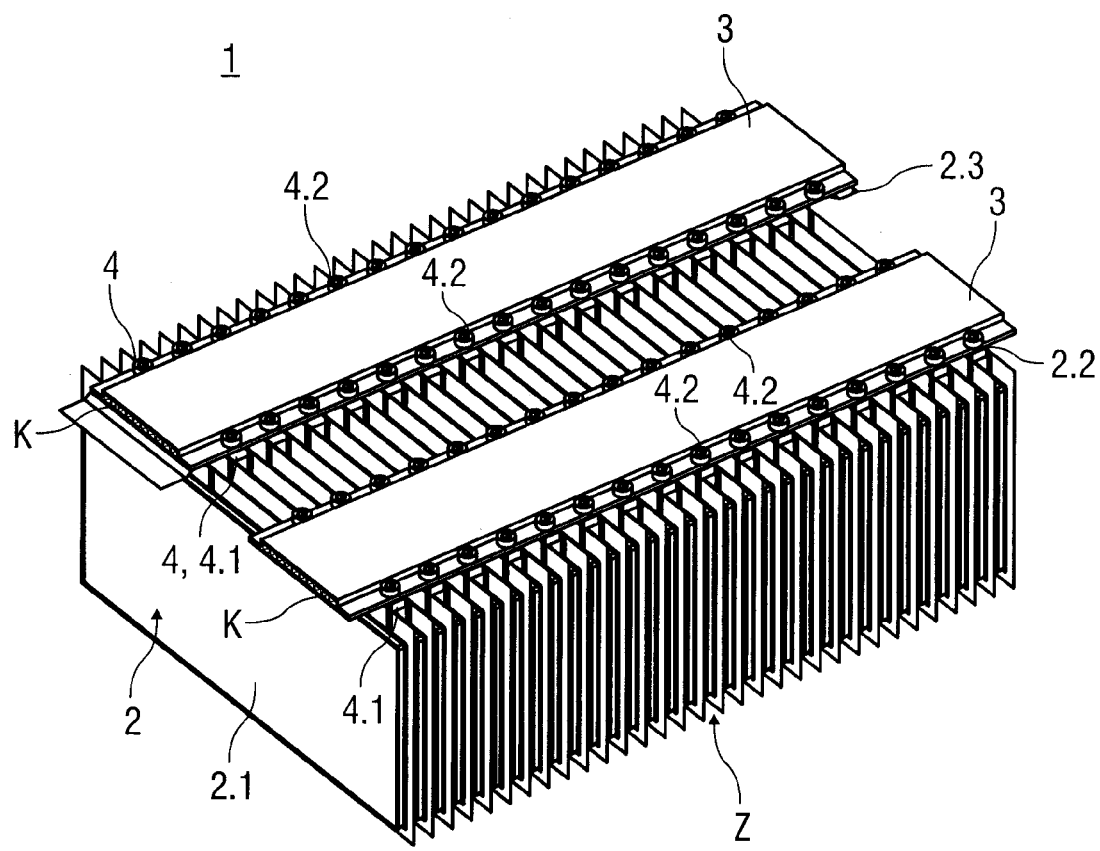

Exemplary embodiments of the present invention relate to a battery with a plurality of individual cells connected in series and/or in parallel to one another, and at least one cooling plate arranged on the pole side on the individual cells, with current drain tabs of electric poles of the individual cells being thermally coupled with the cooling plate and being angled such that they extend parallel to the cooling plate.

A battery for use in motor vehicles, in particular in motor vehicles with a hybrid drive, electric drive or fuel cell vehicles, usually has a cell block consisting of a plurality of battery cells, for example lithium ion cells, connected electrically in series and/or in parallel.

The battery cells have to be cooled in order to dissipate the resulting lost heat. A cooling device that is thermally connected to the battery cells is typically used for this purpose.

A battery, in particular a lithium ion battery, with a plurality of individual cells connected in series and/or in parallel to one another, and a cooling plate arranged on the pole side on the individual cells is known from the not yet published German Patent Application No. DE 10 2008 034 847.8 of the Applicant. Therein, drain tabs, also referred to as current drain tabs, of poles of the individual cells are thermally coupled with the cooling plate. Furthermore, the drain tabs are angled such that they are arranged parallel to the cooling plate in positive manner and/or in non-positive manner, the individual cells being electrically interconnected by welding the drain tabs of adjacent individual cells.

Exemplary embodiments of the present invention provide a battery with improved cooling and increased protection against electrical faults, in particular short circuits, which can be produced in a simple manner.

In accordance with exemplary embodiments of the present invention the battery comprises a plurality of individual cells connected in series and/or in parallel to one another, and a cooling plate arranged on the pole side on the individual cells, with current drain tabs of electric poles of the individual cells being thermally coupled with the cooling plate and being angled such that they extend parallel to the cooling plate.

According to exemplary embodiments of the present invention current drain tabs of adjacent individual cells are electrically interconnected in non-positive and/or in positive manner and pressed with the cooling plate in non-positive and/or in positive manner by means of clamping elements. This simultaneous use of the clamping elements for electrically connecting the adjacent individual cells and for pressing the current drain tabs with the cooling plate simplifies the assembly of the battery, which in turn yields a cost savings. Furthermore, in this particular manner, dissipation of heat from the current drain tabs to the cooling plate is improved, since the current drain tabs, owing to lack of material-to-material connections for electrical contacting, such as for example welds, have a flat surface and hence a large heat transfer surface. Additionally, with a use of a heat conducting foil introduced between the current drain tabs and the cooling plate, owing to the flat surface of the current drain tabs, damage to the heat conducting foil and hence electrical short circuits can be avoided.

Expediently, for simple electrical connection and pressing, the current drain tabs of an individual cell are angled by 90 degrees in the opposite direction such that current drain tabs of adjacent individual cells overlap.

To fasten the clamping elements, the current drain tabs and/or the cooling plate preferably have cutouts which correspond to the clamping elements.

According to one aspect of the invention, the clamping elements each comprise screws, rivets and/or spring elements, so that secure clamping of the current drain tabs with the cooling plate and secure electrical coupling of the individual cells can be effected.

Preferably, the clamping elements are, in each case, formed from a pressure bar and screws, the pressure bar having threaded bores that correspond to the screws. In such case, the screws are preferably guided through the cutouts in the cooling plate and the cutouts in the overlapping current drain tabs into the threaded bore of the pressure bar that is arranged beneath the current drain tabs. Due to this embodiment of the clamping elements, a uniform and flat introduction of force likewise ensures uniform and flat pressing of the current drain tabs with the cooling plate, the pressing and the electrical interconnection of the current drain tabs being able to be produced in a particularly simple manner in one operation. Also, due to the clamping elements that can be opened again, simple dismantling of the battery and hence simple exchange and/or disposal of individual cells is possible. Also, before assembling the battery, in particular before fastening and pressing the current drain tabs against the cooling plate, this embodiment of the current drain tabs means that orientation of the individual cells and hence compensation of tolerances is possible.

In order to improve the heat transfer between the current drain tabs and the cooling plate, which is formed in particular from metal, and to electrically insulate the current drain tabs from the cooling plate, an electrically insulating heat conducting body or an electrically insulating heat conducting foil is arranged between the current drain tabs and the cooling plate.

In order to avoid deformations and damage to the heat conducting foil in the region of the screws between the current drain tabs and the cooling plate due to the pressing, additionally advantageously spacer elements are arranged between the current drain tabs and the cooling plate. The spacer elements expediently have cutouts that correspond to the screws, the cutouts in the cooling plate and the cutouts in the current drain tabs. Further, the spacer elements are formed, in particular, of a mechanically resistant material and are of such dimensions that a defined pressing of the heat conducting foil arranged between the current drain tabs and the cooling plate takes place.

In order also to avoid electrical contact and hence electrical short circuits between the clamping elements and the current drain tabs and/or between the clamping elements and the cooling plate, electrical insulating elements are arranged between the clamping elements and the current drain tabs and/or between the clamping elements and the cooling plate according to one aspect of the invention.

In an advantageous configuration of the battery, the current drain tabs, at least in the region of overlap, have an anticorrosion coating, so that corrosion is avoidable and consequently a constant electrical transfer resistance between the current drain tabs can be brought about over the entire life of the battery.

In order furthermore to prevent penetration of foreign matter, in particular dirt particles and moisture, which may likewise result in an increase in the electrical transfer resistance and in electrical short circuits, the current drain tabs, at least in the region of overlap, are sealed off against penetration of foreign matter. For this, electrically insulating sealing elements, paint coatings, silicones and/or potting compounds are provided.

Preferably the individual cells are arranged parallel to one another, so that the current drain tabs of the individual cells are arranged in at least two rows. In order to minimize the weight of the battery and at the same time to ensure effective cooling of the individual cells, one cooling plate in each case is associated with each row of current drain tabs, which plate extends in particular in each case over the surface formed by the overlapping current drain tabs which are arranged in a row.

The battery, according to one configuration of the invention, is a vehicle battery, in particular a battery for a vehicle with electric drive, hybrid drive or a fuel cell vehicle. Preferably the battery is a lithium ion battery. Due to the low weight, the high degree of safety and the reduced costs, the battery is preferably suitable for application in a vehicle.

BRIEF DESCRIPTION OF THE DRAWING FIGURES

Figure 2:
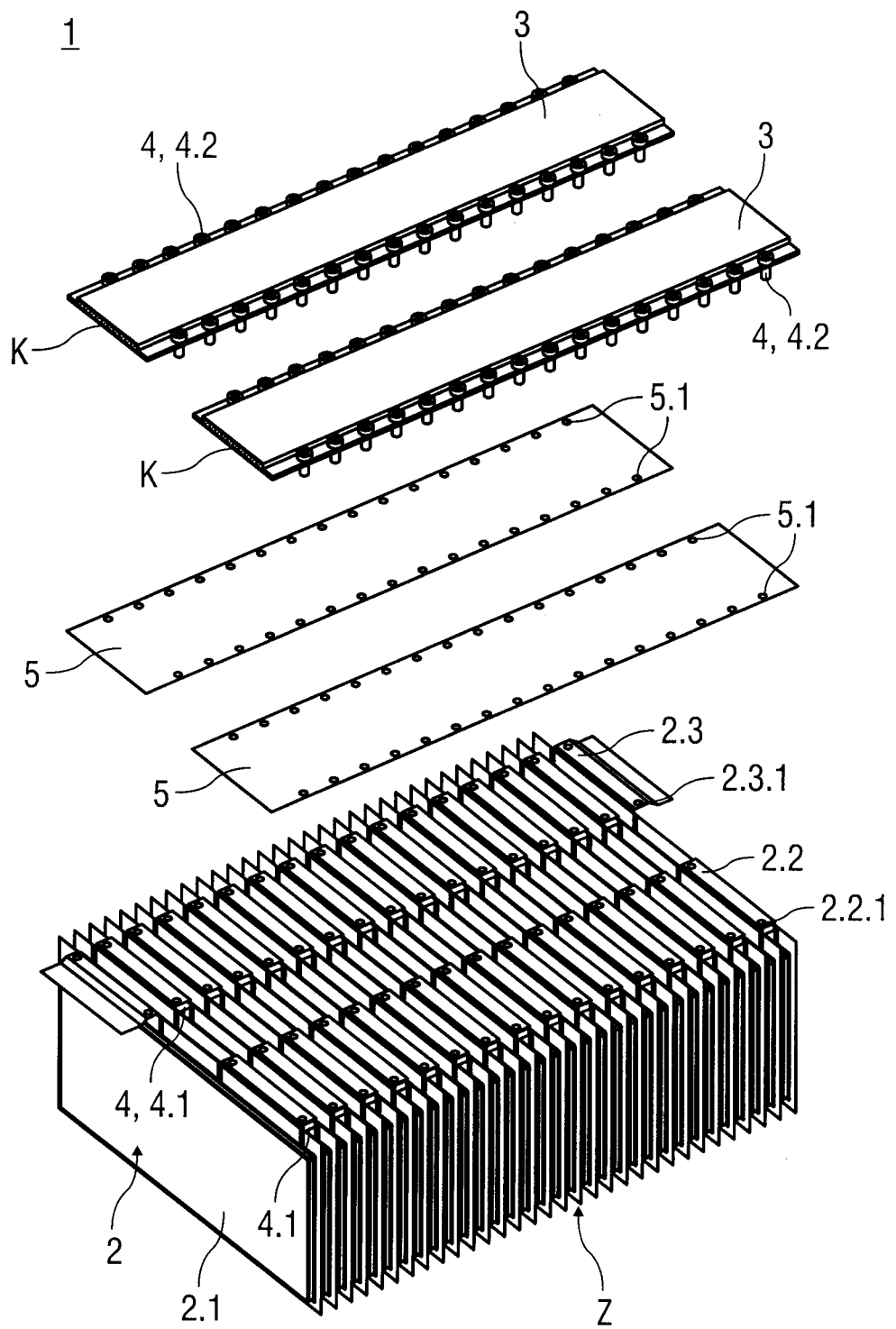
Figure 3:
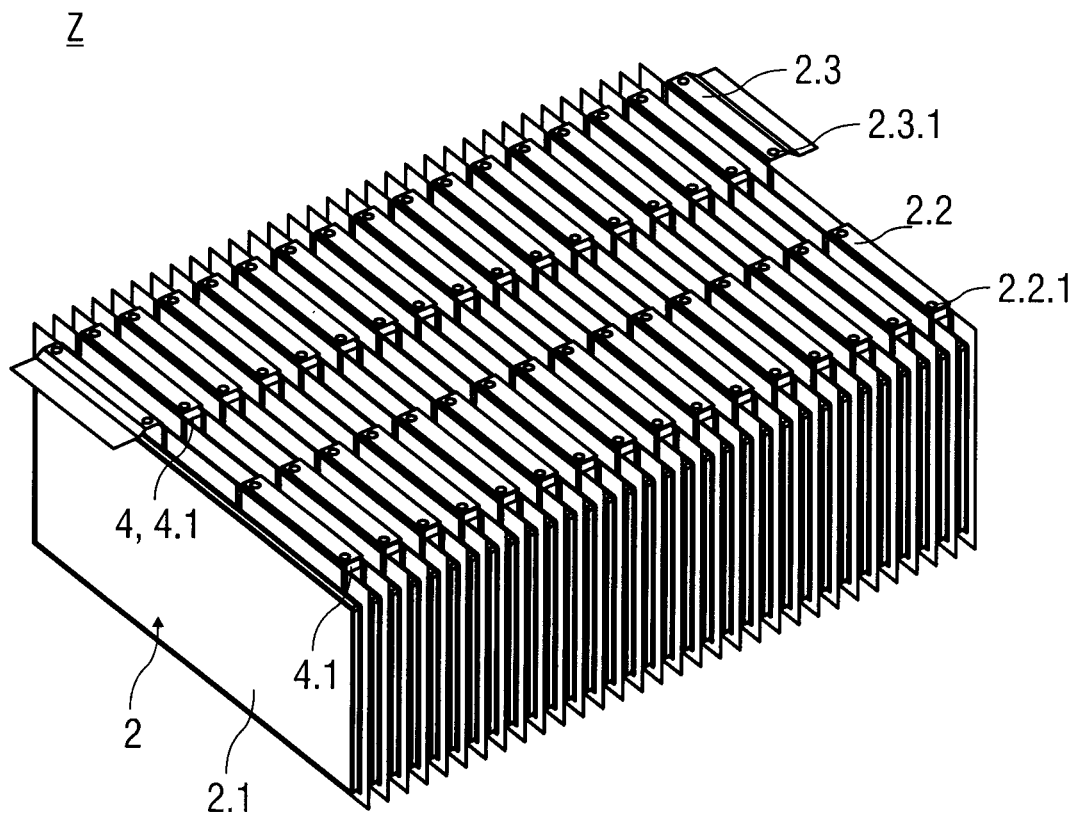
Figure 4:
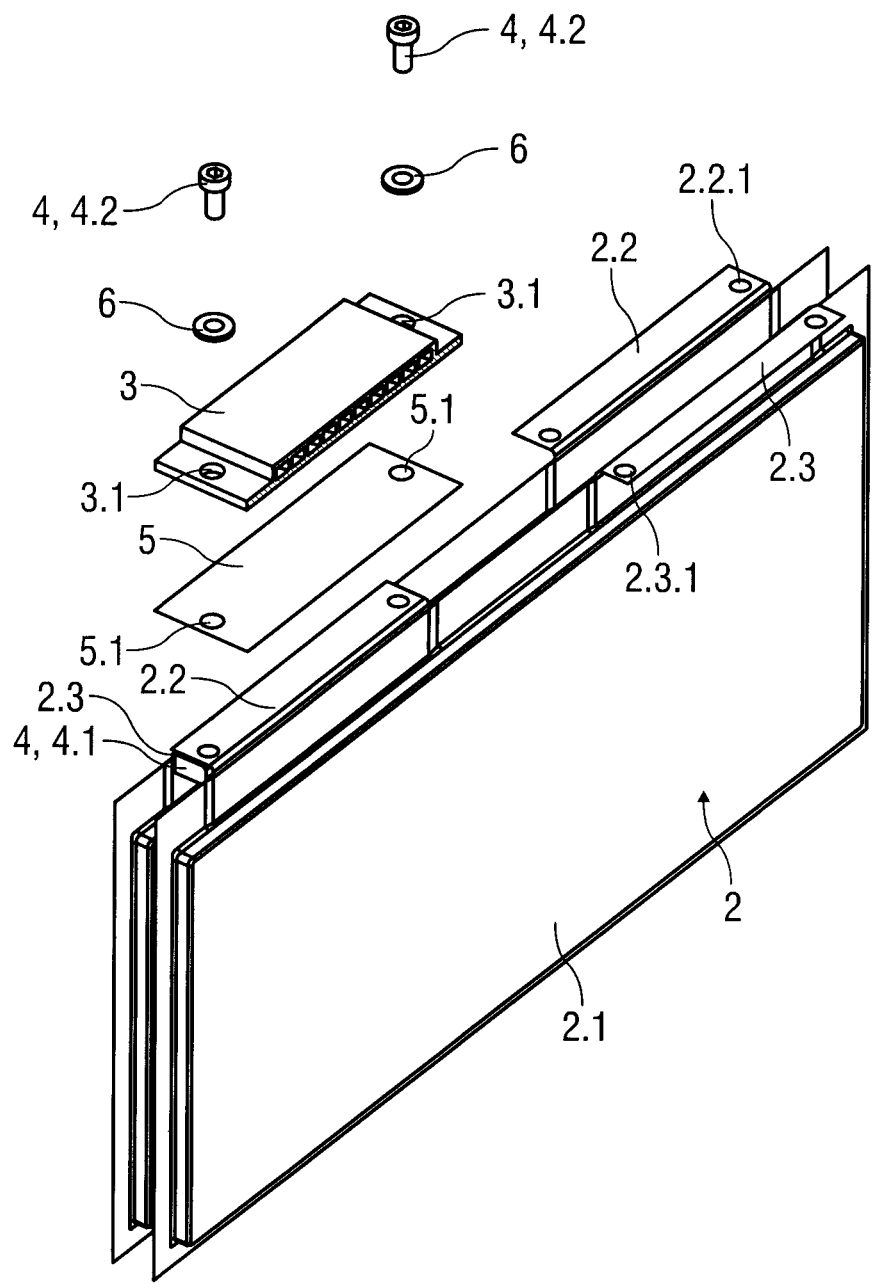
Figure 5:
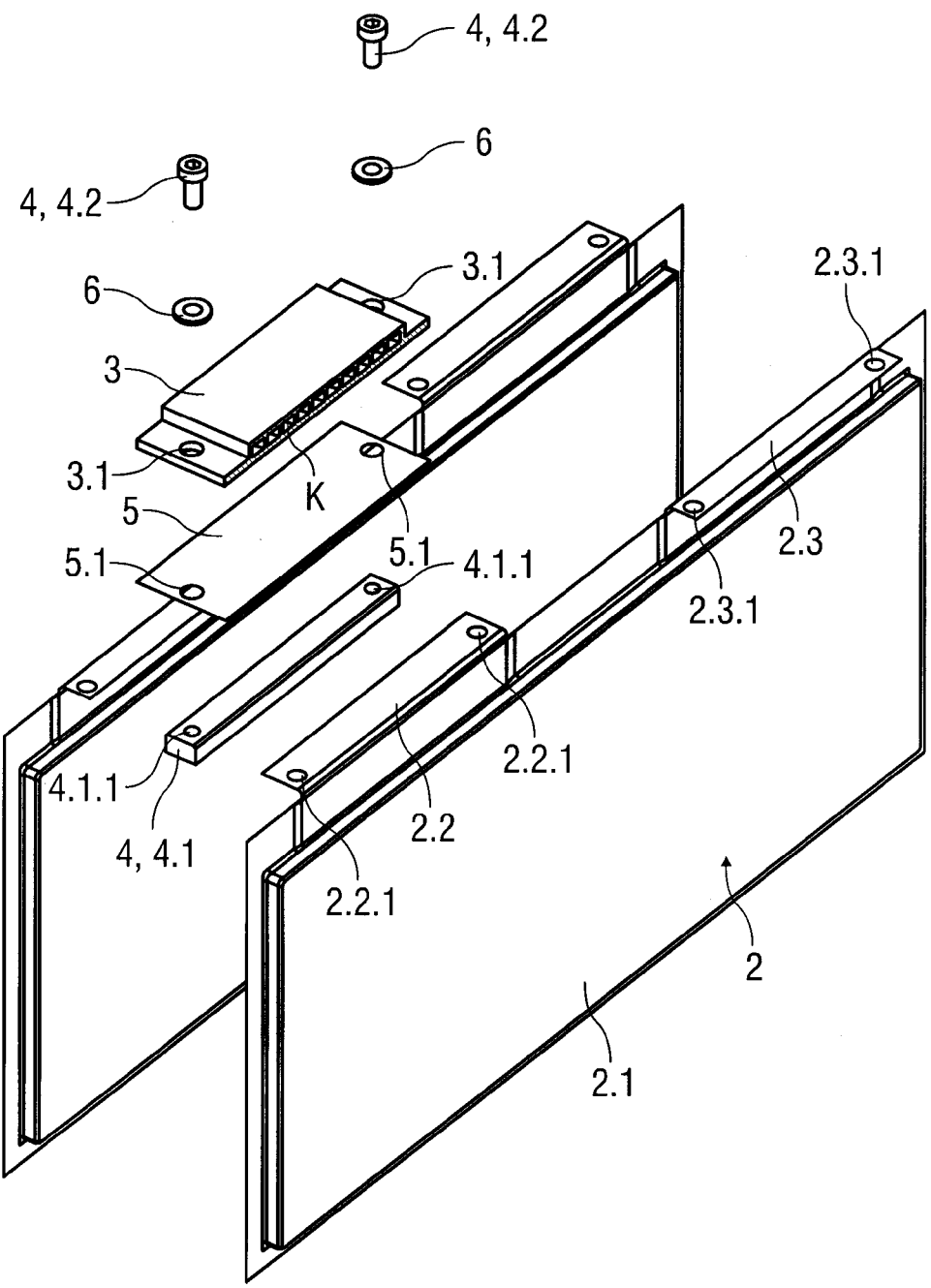
Figure 6:
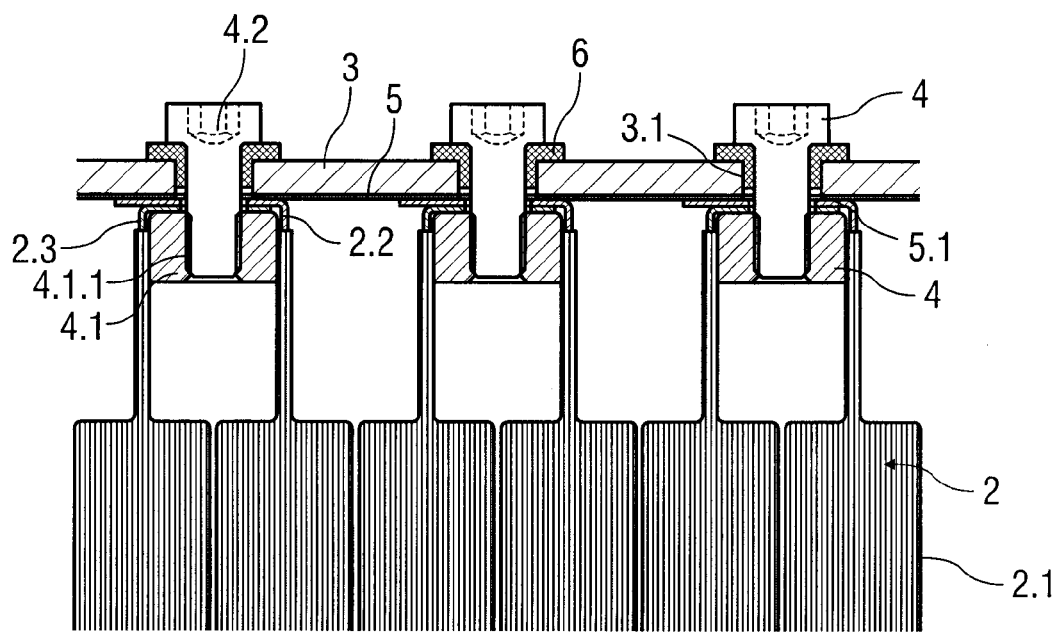
Figure 7:
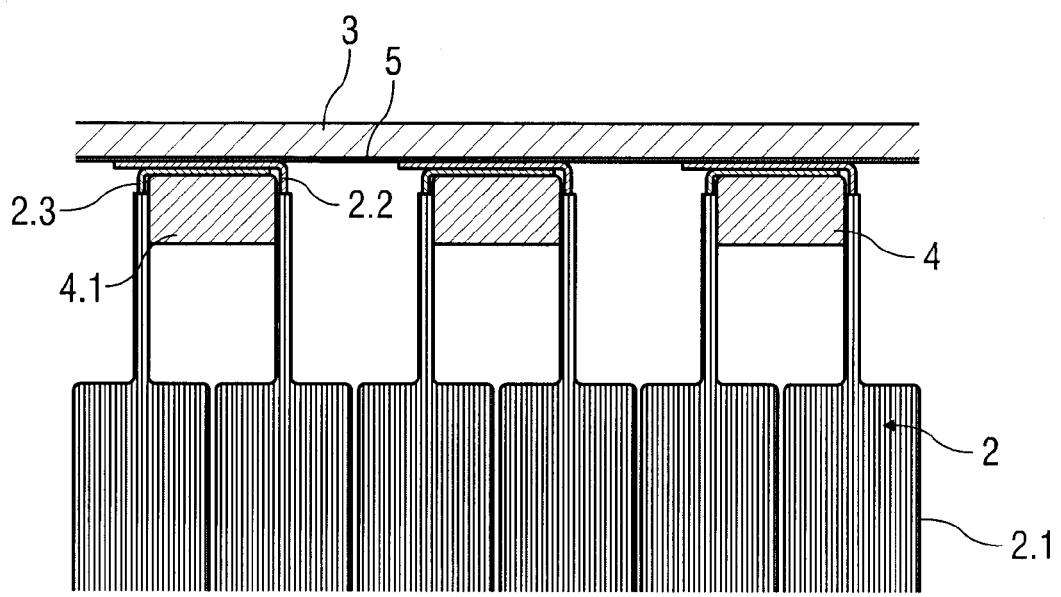
Figure 8:
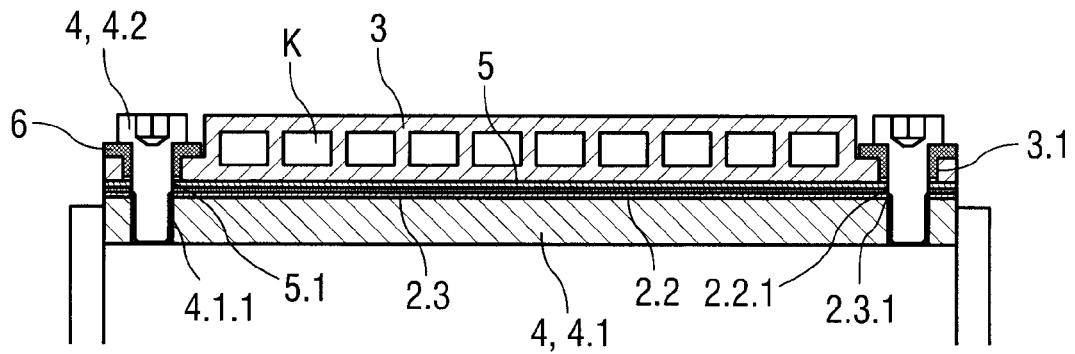
Figure 9:
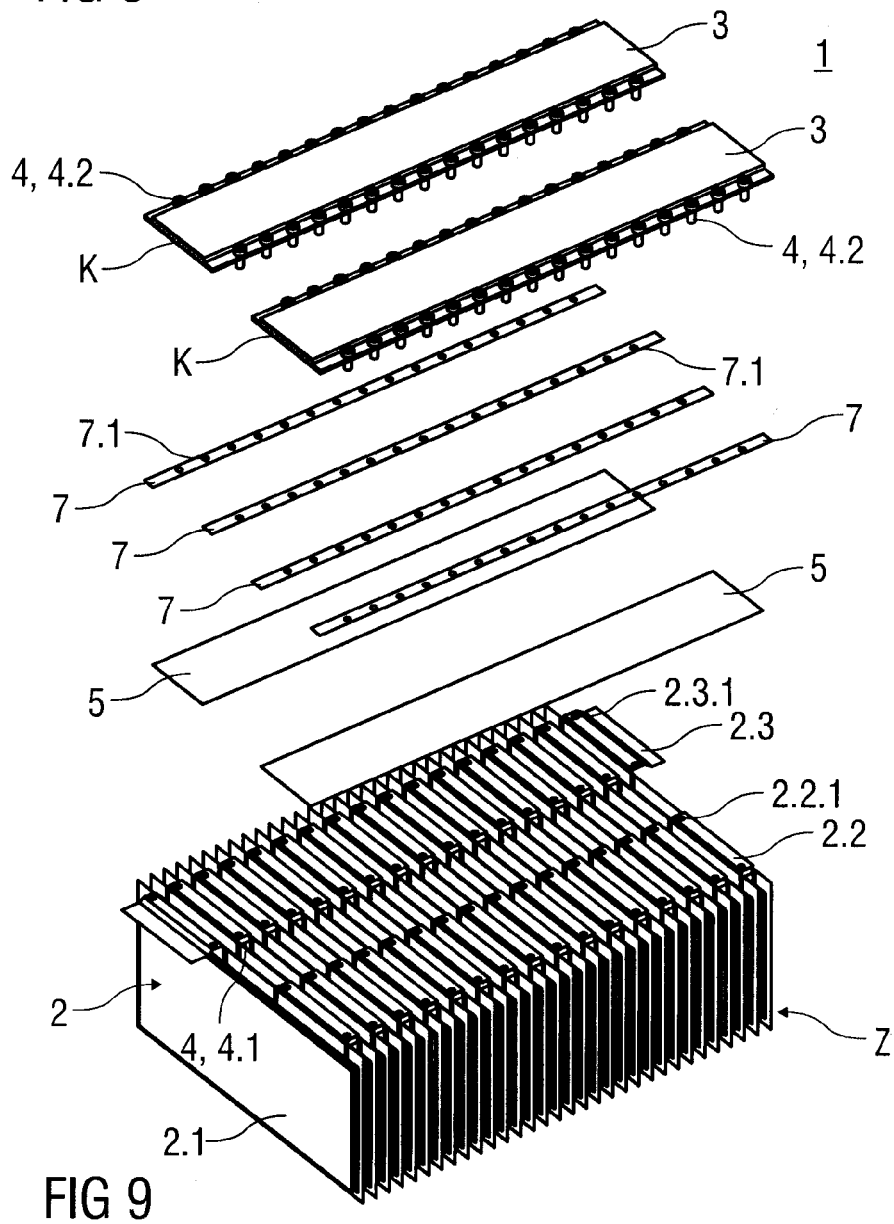
Figure 10:
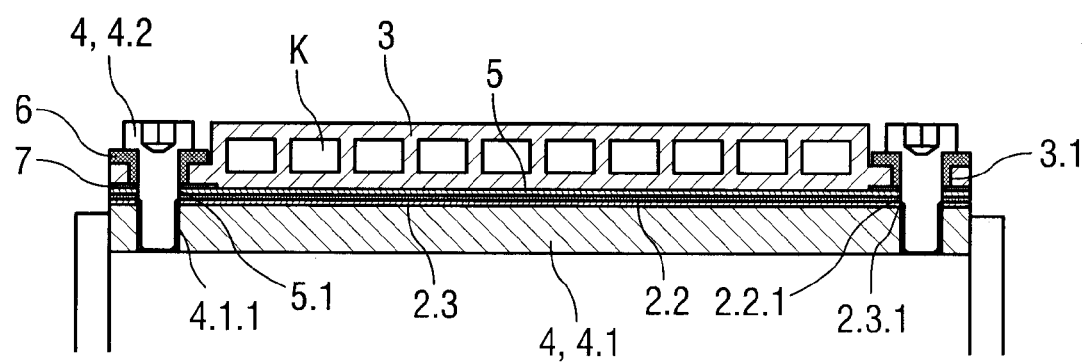

Examples of embodiment of the invention will be explained in greater detail below with reference to drawings. Therein:

FIG. 1 diagrammatically illustrates a battery with a plurality of individual cells in a perspective view, FIG. 2 diagrammatically illustrates an exploded view of the battery according to FIG. 1, FIG. 3 diagrammatically illustrates a cell assembly of the battery according to FIG. 1, FIG. 4 diagrammatically illustrates a first exploded view of two individual cells of the battery according to FIG. 1, arranged adjacently, FIG. 5 diagrammatically illustrates a second exploded view of two individual cells of the battery according to FIG. 1, arranged adjacently, FIG. 6 diagrammatically illustrates a longitudinal section through the battery according to FIG. 1 in the region of a cooling plate and in a plane of clamping elements, FIG. 7 diagrammatically illustrates a longitudinal section through the battery according to FIG. 1 in the region of the cooling plate and outside the plane of the clamping elements, FIG. 8 diagrammatically illustrates a cross section through the battery according to FIG. 1 in the region of the cooling plate and in the plane of the clamping elements, FIG. 9 diagrammatically illustrates an exploded view of a battery with spacer elements arranged between the cooling plate and current drain tabs, and FIG. 10 diagrammatically illustrates a cross section through the battery according to FIG. 9 in the region of the cooling plate and in the plane of the clamping elements.

Parts which correspond to one another are provided with the same reference numerals in all the figures.

DETAILED DESCRIPTION

FIGS. 1 and 2 show a battery 1 in different views. The battery 1 in this case comprises a cell assembly Z formed from a plurality of individual cells 2 and illustrated in FIG. 3, the individual cells 2 being connected electrically in series and/or in parallel to form the cell assembly Z.

The individual cells 2 are formed as flat cells which, in a manner not shown further, have in the interior of the cell, in each case, a cell core of electrochemically active foils that lie one on another. The cell core of the individual cells 2 is surrounded, at least in regions, in each case by a cell housing 2.1.

In the example of embodiment shown here, the individual cells 2 are what are called "coffee bag" or pouch cells, in which the cell housing 2.1 is formed from a thin, electrically insulating foil that surrounds the cell core. The insulating foil, after evacuation, is closed on a circumambient edge by foil welding.

On an upper edge of the individual cell 2, two current drain tabs 2.2, 2.3 are guided through the cell housing 2.1 and are connected in the interior of the cell, in each case, to an electric pole of the cell core of the individual cell 1. The current drain tabs 2.2, 2.3 are formed of a thermally conductive and electrically conductive material, for example of copper, so that they are provided at the same time for electrical connection of the individual cells 1 and for dissipation of a lost heat produced during the operation of the individual cell 2 from the interior of the cell. In order to avoid corrosion of the current drain tabs 2.2, 2.3, they are provided at least partially with an anticorrosion coating, for example of nickel, tin or gold.

To form the illustrated cell assembly Z, the plurality of the individual cells 2 are arranged in parallel one after the other, the individual cells 2 being rotated by 180 degrees alternately in their longitudinal axis for series connection. In other words, in each case a negative electric pole of an individual cell 2 is electrically connected to a positive electric pole of a subsequent individual cell 2 using the current drain tabs 2.2, 2.3. In the case of parallel electrical connection, the individual cells 2 are in each case arranged one after the other in the same orientation, so that in each case a negative electric pole of an individual cell 2 is electrically connected to a negative electric pole of a subsequent individual cell 2, and a positive electric pole of the individual cell 2 to a positive pole of the subsequent individual cell 2, using the current drain tabs 2.2, 2.3.

Due to this arrangement of the individual cells 2, individual cells 2 of the same type can be used for the battery 2, since the current drain tabs 2.2, 2.3, which are arranged in each case in parallel, of adjacent individual cells 2 can be connected together both electrically in series and also in parallel. Since the individual cells 2 are arranged parallel one after the other, the current drain tabs 2.2, 2.3 of the individual cells 2 are arranged in two rows in the cell assembly Z.

For electrical connection, the current drain tabs 2.2, 2.3 of the individual cells 2 are angled by 90 degrees in the opposite direction, so that in each case current drain tabs 2.3, 2.3 of adjacent individual cells 2 overlap. A free current drain tab 2.3 of a first individual cell 2 of the cell assembly Z and a free current drain tab 2.2 of a last individual cell 2 of the cell assembly Z serve in each case as high voltage contacts of the battery 1, with one of the current drain tabs 2.2, 2.3 of these individual cells 2 being formed extended in each case for this purpose. The high voltage contacts are provided for electrical coupling of the battery 1 with electrical consumers, not illustrated in greater detail, and/or an electrical system of a vehicle.

At the same time, in order to electrically interconnect the individual cells 2 in non-positive and/or in positive manner and to connect them thermally in non-positive and/or in positive manner to two cooling plates 3 via the current drain tabs 2.2, 2.3 on a side facing them, clamping elements 4 are provided according to the invention. According, in each case one cooling plate 3 is associated with each row of current drain tabs 2.2, 2.3, the width-wise extent of which plate corresponds to the width of the current drain tabs 2.2, 2.3 and the length of which corresponds at least to the length of the cell assembly Z or, as in the example of embodiment illustrated, is greater than it.

The cooling plates 3 are formed in particular from a metallic, readily thermally conductive material. In order to avoid electrical contact between the current drain tabs 2.2, 2.3 and the cooling plates 3 and thus an electrical short circuit of the individual cells 2, a heat conducting foil 5 made of an electrically insulating material is, in each case, arranged between the rows of current drain tabs 2.2, 2.3 and the cooling plates 3, which foil electrically insulates the cooling plate 3 from the current drain tabs 2.2, 2.3 and optimizes transmission of heat between the individual cells 1 and the respective cooling plate 3.

For clamping the current drain tabs 2.2, 2.3 to the cooling plates 3 and for electrically interconnecting the current drain tabs 2.2, 2.3 of adjacent individual cells 2, the clamping elements 4 in the present example of embodiment in each case comprise a pressure bar 4.1 which is arranged beneath the overlapping current drain tabs 2.2, 2.3.

Additionally, the clamping elements 4 in each case comprise two screws 4.2, which are guided through cutouts 3.1 in the cooling plates 3 illustrated in greater detail in FIG. 4, through cutouts 5.1 in the heat conducting foils 5 and through cutouts 2.2.1, 2.3.1 in the overlapping current drain tabs 2.2, 2.3 into threaded bores 4.1.1, illustrated in greater detail in FIG. 5, in the pressure bar 4.2 arranged beneath the current drain tabs 2.2, 2.3. In these threaded bores 4.1.1, the screws 4.2 are fastened such that the current drain tabs 2.2, 2.3 are electrically connected together in non-positive and in positive manner and are pressed against the respective cooling plate 3 in non-positive and in positive manner.

One particular advantage of this configuration of the electrical and thermal connection is that lateral displaceability of the current drain tabs 2.2, 2.3 relative to one another is possible before the screws 4.2 are tightened, to allow compensation for any tolerances of the individual cells 2 or of their components.

In order to avoid the ingress of foreign matter, in particular moisture and dirt particles, into the joint region between the current drain tabs 2.2, 2.3 themselves and the joint region between the current drain tabs 2.2, 2.3 and the respective cooling plate 3, additionally these joint regions are protected against penetration of foreign matter, in a manner not shown further, by introducing a potting compound, applying a paint coating and/or arranging a sealing element.

For efficient cooling of the individual cells 2, the cooling plates 3 have in each case cooling ducts K for carrying a cooling medium. The cooling medium may be either a gaseous or a liquid cooling medium. Since the battery 1 is in particular a vehicle battery, preferably a battery 1 for a vehicle with electric drive, hybrid drive or a fuel cell vehicle, it is particularly advantageous if the cooling plates 3 of the battery 1 are incorporated in a coolant circuit of the vehicle, in particular a refrigerant circuit of a vehicle air conditioning system. Alternatively or additionally, cooling with air is possible.

FIGS. 4 and 5 in each case illustrate two individual cells 2 of the battery 1 arranged adjacent in different exploded views. In order to avoid electrical contact of the screws 4.2 and penetration of foreign matter into the cutouts 2.2.1, 2.3.1 in the current drain tabs 2.2, 2.3, the cutouts 3.1 in the cooling plates 3, the cutouts 5.1 in the heat conducting foil 5 and into the threaded bores 4.1, in each case an insulating element 6 is arranged between the screw head and a surface of the respective cooling plate 3.

FIG. 6 shows a longitudinal section through the battery 1 in the region of the cooling plate 3 and in a plane of the clamping elements 4 in order to make clear the pressing of the current drain tabs 2.2, 2.3 with the cooling plate 3, the electrical connection of the current drain tabs 2.2, 2.3 and the structure of the clamping elements 4.

The insulating elements 6, as shown in the example of embodiment illustrated, are formed and pressed by means of the screws 4.2 into the cutouts in the cooling plate 3 such that no electrical contact is possible between the screws 4.2 and the cooling plate 3.

FIG. 7 shows a further longitudinal section through the battery 1 in the region of the cooling plate 3, but outside the plane of the clamping elements 4. This sectional view makes clear the positive connection between the current drain tabs 2.2, 2.3 themselves and between the current drain tabs 2.2, 2.3 and the cooling plate 3, so that both a low electrical transfer resistance between the current drain tabs 2.2, 2.3 and a low thermal transfer resistance between the current drain tabs 2.2, 2.3 and the cooling plate 3 can be produced. Also, large current-carrying surfaces between the current drain tabs 2.2, 2.3 and large heat-transmitting surfaces between the current drain tabs 2.2, 2.3 and the cooling plate 3 are obtained. There advantageously results from this a high degree of electrical efficiency and a high degree of efficiency of cooling.

FIG. 8 shows a cross section through the battery according to FIG. 1 in the region of one of the cooling plates 3 and in the plane of the clamping elements 4 in a detail view, with a width of the cooling plate 3 being as large as a width of the current drain tabs 2.2, 2.3.

FIG. 9 and FIG. 10 show the battery 1 with a plurality of individual cells 2 in different views.

In order to avoid deformation and damage to the heat conducting foil 5 in the region of the screws 4.2 between the current drain tabs 2.2, 2.3 and the cooling plate 3 due to the pressing, spacer elements 7 are arranged between the current drain tabs 2.2, 2.3 and the cooling plate 3. The spacer elements 7 are formed from a mechanically resistant and electrically insulating material. Furthermore, the spacer elements 7 have cutouts 7.1 which correspond to the screws 4.2, the cutouts 3.1 in the cooling plate 3 and the cutouts 2.2.1, 2.3.1 in the current drain tabs 2.2, 2.3, so that the screws 4.2 can be guided therethrough.

In this case, a thickness of the spacer elements 7 is selected such that a defined pressing of the heat conducting foil 5 arranged between the current drain tabs 2.2, 2.3 and the cooling plate 3 occurs, i.e., the foil is not damaged. The heat conducting foil 5, when the spacer elements 7 are used, extends in the region between them.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A battery, comprising:
 a plurality of individual cells connected in series or in parallel to one another, each of the individual cells having a cell housing and a current drain tab having a first portion that extends into the cell housing and a second portion that extends out of the cell housing, wherein the second portions of the current drain tabs of an individual cell are angled by 90 degrees in an opposite direction such that current drain tabs of adjacent individual cells overlap and are electrically connected with each other;
 at least one cooling plate arranged on a pole side on the plurality of individual cells, with the current drain tabs of electric poles of the plurality of individual cells being thermally coupled with the cooling plate and being angled such that they extend parallel to the cooling plate; and clamping elements arranged to electrically interconnect the current drain tabs of adjacent individual cells in non-positive or positive manner and to press the current drain tabs of adjacent individual cells with the cooling plate in non-positive or positive manner.

2. The battery as claimed in claim 1, wherein the current drain tabs have cutouts corresponding to the clamping elements.

3. The battery as claimed in claim 1, wherein the cooling plate has cutouts corresponding to the clamping elements.

4. The battery as claimed in claim 1, wherein the clamping elements comprise screws, rivets or spring elements.

5. The battery as claimed in claim 1, wherein the clamping elements are formed from a pressure bar and screws, the pressure bar having threaded bores corresponding to the screws.

6. The battery as claimed in claim 5, wherein the screws pass through cutouts in the cooling plate and cutouts in overlapping current drain tabs into the threaded bore of the pressure bar that is arranged beneath the current drain tabs.

7. The battery as claimed in claim 5, wherein spacer elements are arranged between the current drain tabs and the cooling plate, at least in a region of the screws.

8. The battery as claimed in claim 7, wherein the spacer elements have cutouts corresponding to the screws, the cutouts in the cooling plate and the cutouts in the current drain tabs.

9. The battery as claimed in claim 1, wherein electrical insulating elements are arranged between the clamping elements and the current drain tabs, or between the clamping elements and the cooling plate.

10. The battery as claimed in claim 1, wherein the current drain tabs have an anticorrosion coating, at least in a region of overlap between the current drain tabs.

11. The battery as claimed in claim 1, wherein the current drain tabs are sealed off against penetration of foreign matter at least in a region of overlap between the current drain tabs.

12. The battery as claimed in claim 1, wherein an electrically insulating heat conducting body or an electrically insulating heat conducting foil is arranged between the current drain tabs and the cooling plate.

13. The battery as claimed in claim 1, wherein the plurality of individual cells are arranged parallel to one another so that the current drain tabs of the individual cells are arranged in at least two rows, with one cooling plate in each case being associated with each row of current drain tabs.

14. The battery as claimed in claim 1, wherein the battery is a vehicle battery for a vehicle with electric drive, hybrid drive or a fuel cell vehicle.

* * * * *